Patented June 17, 1930

1,763,875

UNITED STATES PATENT OFFICE

LEON P. ANTHONY, OF LOS ANGELES, CALIFORNIA, ASSIGNOR OF FIFTY-FIVE PER CENT TO RALPH W. REYNOLDS, OF LOS ANGELES, CALIFORNIA

NUT-CRACKING MACHINE

Application filed March 12, 1927. Serial No. 174,810.

This invention relates to a nut cracking machine, and while features of the invention may be utilized in machines for cracking nuts of any kind, shape or size, many features of the invention particularly adapt it for use in cracking elongated nuts such as Brazil nuts, pecans and the like. In a prior application, Serial No. 86,705, filed February 8, 1926, for nut cracking apparatus I disclosed a nut cracking machine in which the force which cracked the nut was exerted in a vertical plane and operated through horizontally swinging jaws, to crack the nut. According to the present invention the force which effects the cracking of the nut is exerted in a substantially horizontal direction. In the operation of the machine the jaw which effects the cracking of the nut is first moved in such a way that it is automatically set against the nut preparatory to cracking it. After the jaw is set in place, it is moved forcibly against the nut to crack it.

The general object of this invention is to provide a mechanism of simple construction for cracking nuts and which will be of horizontal type, that is to say, a machine in which forces which crack the nut are exerted in a horizontal direction upon it; also to provide simple means for supporting the nut and effecting the setting of the cracking jaw against it.

The mechanism includes a cradle which supports the nut while it is being cracked and one of the objects of the invention is to provide means for properly directing the nuts one at a time into the cradle and for automatically ejecting the cracked nut or permitting the same to fall from the cradle.

The invention involves the use of a carrier or elevator which brings the nuts from a hopper to the cradle and one of the objects of the invention is to provide simple means for preventing the elevator or conveyor from delivering more than one nut at a time to the cradle.

Further objects of the invention will appear hereinafter.

The invention consists of the novel parts and combination of parts to be described hereinafter, all of which contribute to produce an efficient nut cracking machine.

A preferred embodiment of the invention is described in the following specification, while the broad scope of the invention is pointed out in the appended claims.

Figure 1:
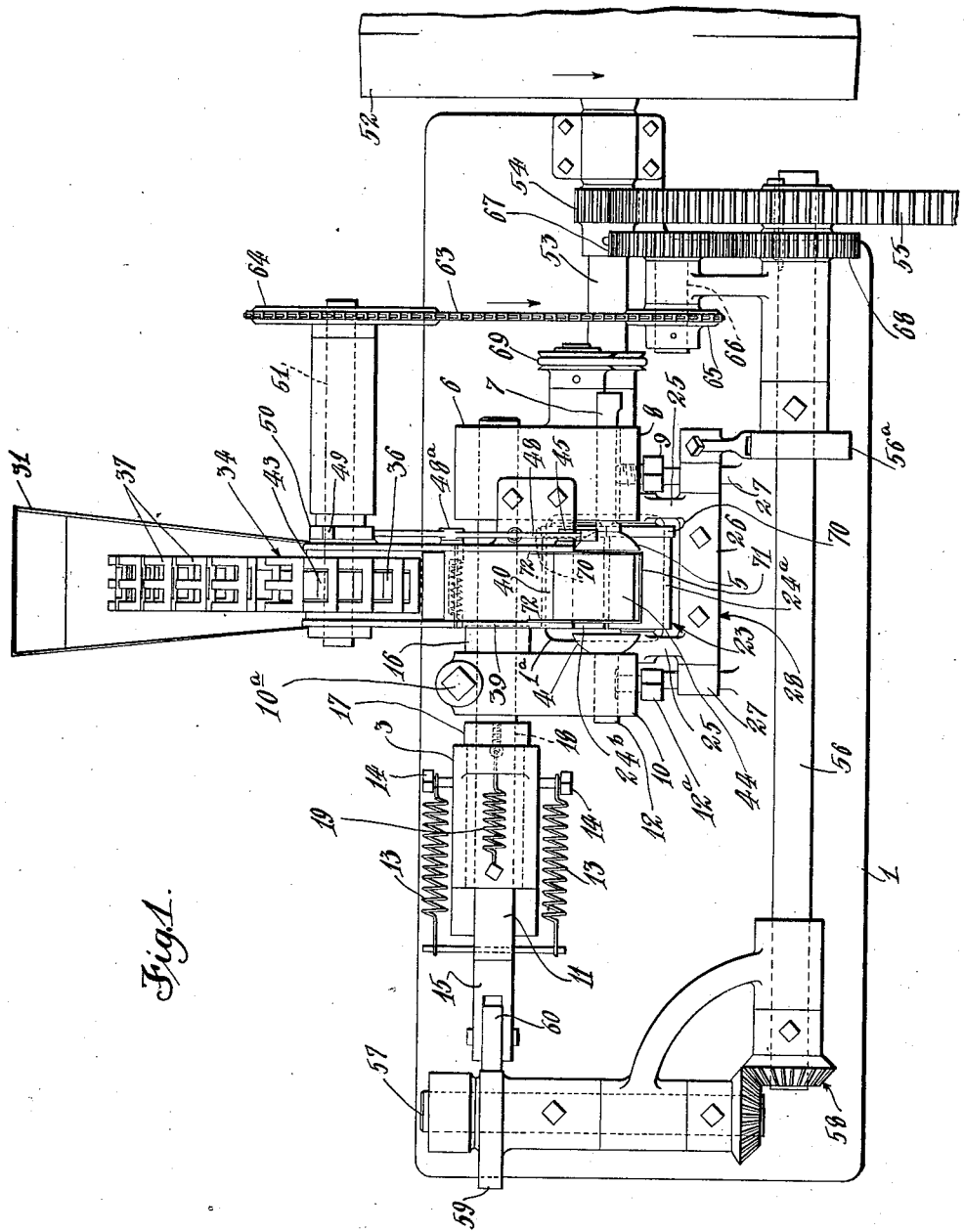
Figure 1 is a plan of a nut cracking machine embodying my invention.

In its general construction, the machine includes a frame 1 which may be mounted upon suitable legs 2. The upper portion of the frame 1 is in the form of a horizontal bed plate. On this bed plate a suitable bracket 3 extends upwardly to operate as a guide and support for a movable jaw 4 of the machine. In this connection, it should be understood that the invention may be embodied in a machine in which both the cracking jaws for the nut move, but in the present embodiment of the machine, the jaw 4 is relatively movable while the cooperating jaw 5 is relatively fixed and secured adjustably in a bracket 6, which, like the bracket 3 extends up from the main frame of the machine. The jaw 5 is in the form of a shallow cup attached to a neck 7 mounted in a boss 8 at the upper end of the bracket 6; this neck can be clamped in any position by a set screw 9. This enables the fixed jaw 5 to be placed in any desired position.

The movable jaw 4 is supported and operated in such a way that during the operation of the machine it will be first moved by setting means so as to set it against the nut after which it is moved forcibly so as to crack the nut. This mode of operation adapts the machine to operate on nuts of different sizes or different lengths. In order to accomplish this and support and guide the movable jaw 4, I provide a carriage 10 in the form of a bracket. Carrying the upper end of this bracket a plunger 11 is provided, said plunger being supported and guided to slide in the upper end of the bracket 3. The carriage 10 is clamped adjustably on the plunger by a clamping bolt 10ª. The movable jaw 4 has a neck 12 similar to the neck 7 which may be adjustably clamped in the upper end of the carriage 10 by means of a set screw 12ª. I provide setting means for urging the plunger 11 and this movable jaw 4 toward the nut, and this setting means includes a coil spring 13, one end of which is attached to the tail end of the plunger 11 and the other end of which is anchored on a bolt 14 on the side of the bracket 3. If desired, there may be two of these springs 13.

An operating plunger 15 is provided which is guided to slide longitudinally on the frame 1 and along a line parallel with the axis of the jaw plunger 11; in other words, the plunger 15 is guided to slide parallel with the direction of movement of the movable jaw 4. When a nut is placed in position between the two jaws 4 and 5, the spring 13, of course, is exerting its force in a direction which tends to move the movable jaw 4 up against the nut so as to set this jaw preparatory to the cracking of the nut. However, I provide a detent 16 which engages the side of the carriage 10 which is toward the position of the nut and, at first, prevents the jaw 4 from moving into contact with the nut. This detent arm 16 is rigidly secured on the operating plunger 15, and is preferably adjustably secured to it. Associated with the plunger 11 and the jaw 4 I provide a clutch 17. This clutch is in the form of an elongated plate or arm having an opening 18 for receiving the plunger 11. This clutch plate 17 is held up against the end face of the bracket 3 by means of a coil spring 19 which is disposed out of line with the axis of the plunger 11. On the plunger 15 I provide means for engaging the end of the clutch plate 17. This means is in the form of a split collar 20 mounted on adjusting threads 21 on the plunger and provided with clamping bolts 22 which enable it to be secured tightly on the threads at any point desired.

The nut which is to be cracked between the jaws 4 and 5 is supported on suitable means preferably in the form of a cradle 23 consisting of two bolsters 24 which should be in the form of rollers. These bolsters or rollers 24 lie parallel with each other at about the same level so that they will operate to support a nut lying in the "pocket" or "valley" on their upper sides; they are also mounted so that they are separable from each other; this enables the cradle to be opened to permit the cracked nut to fall out.

One of these rollers is preferably supported in a fixed position on the bracket 6 already referred to, but the other roller, indicated specifically by the reference numeral 24ª, is supported on two rock arms 25 which operate automatically to swing this roller away from the other roller 24ᵇ. These arms 25 project from a common hub 26, see Figure 2, which is supported to rock on brackets 27 which extend up from the upper side of the bed plate of the frame. In other words, the arms 25 with their connecting hub 26 constitute a rocking frame 28. This frame is rocked automatically periodically by means which will be described hereinafter.

The relatively fixed jaw is located between the ends of the rollers 24 and its lower portion is cut away at each side so as to form notches 29 with a downwardly extending tongue 30 between the notches which projects down into the valley or pocket between the rollers. The relatively movable jaw is similarly constructed but this jaw is normally located slightly removed from the end of the cradle, see Figure 2. This relatively fixed roller is indicated specifically by the numeral 24ᵇ. This roller is continuously rotated by means which will be described hereinafter and movement is imparted from it to the other roller so that the rollers are continuously rotated in the direction indicated by the arrows in Figure 3. That is to say, the adjacent faces of the rollers move downwardly on the middle axis of the cradle.

In order to feed nuts to the cradle and deliver them one by one, I provide a hopper 31 to hold the nuts 32 indicated in dotted lines. This hopper has an inclined bottom 33, and at one side of the hopper I provide an endless conveyor or elevator 34 having an endless chain, one run 35 of which passes upwardly through the hopper in an inclined direction. The ends of this conveyor are guided on suitable sprocket wheels 36. The conveyor chain 34 carries "buckets" which are in the form of curved fingers 37. These fingers pass through slots 38 in the bottom 33 of the hopper and operate to pick up the nuts and carry them up to the upper end of the elevator where they are delivered one by one into an inclined chute 39, the delivery mouth 40 of which is located quite near the cradle 23. The construction of the buckets 37 is such that they usually pick up a single nut in the hopper and carry it up to deliver it into the chute. However, it may happen that more than one nut will be carried up by the bucket as indicated in dotted lines at the points 41 and 42 in Figure 3. In order to dislodge the second nut which is supported in the bucket above the first nut, I provide kickers on the upper sprocket wheels 36, said kickers being in the form of elongated teeth 43 formed on the sprocket wheels. These teeth are located so that they are near the upper or open side of each bucket as it passes onto the sprockets 36. In this way, as each bucket passes over the sprockets 36, the ends of the kicker teeth 43 pass right through the space directly over the lower nut on the bucket (if there are two) and this will shove the upper nut out of the bucket and permit it to fall back into the hopper.

If the nuts delivered one by one into the chute were permitted to slide by gravity down the chute directly into the cradle, each nut would acquire considerable velocity when it arrived at the cradle and would tend to bounce around. This would consume time and would tend to slow up the speed of operation and capacity of the machine. For this reason, I provide means for holding back each nut as it arrives at the delivery mouth of the chute and at the proper time I release the nut and permit it to fall into the cradle. In order to accomplish this, I provide the lower end of the chute with a movable gate 44. This gate is simply a plate pivoted to swing on a horizontal shaft 45 which passes through or across the upper portion of the chute at the mouth. In order to open this gate automatically at the proper times, I provide the shaft 45 with an arm 46 which is connected by a link 47 with an actuating lever 48, said lever being supported on a pivot 48$^a$ on the side of the chute and having a short arm which is engaged in succession by two cam arms 49 formed on a cam 50 secured to the upper shaft 51 of the elevator.

The means for driving the different parts of the machine will now be described.

The power comes into the machine at a belt pulley 52 which drives its own shaft 53. This shaft 53 carries a rigid pinion 54 which drives a large gear wheel 55 on a counter shaft 56. This counter shaft drives a cam shaft 57, see Figure 1, through suitable bevel gears 58. The cam shaft 57 carries a cam 59 which reciprocates the operating plunger 15 through the medium of a roller 60. The roller 60 is held up against the cam 59 by a spring 61 attached by a bolt 62 to the detent arm 16 and anchored at its other end to the bracket 3. Cam 56$^a$ on shaft 56 actuates the rocker frame 28 (see Figure 3).

The elevator is driven by means of a sprocket chain 63 passing over a sprocket 64 on the upper shaft 51 of the elevator. This sprocket chain 63 extends down from the shaft 51 in an inclined direction and passes around a driving sprocket wheel 65 carried on a counter shaft 66 driven through two gears 67 and 68, the latter of which is carried on the shaft 56.

Figure 3:
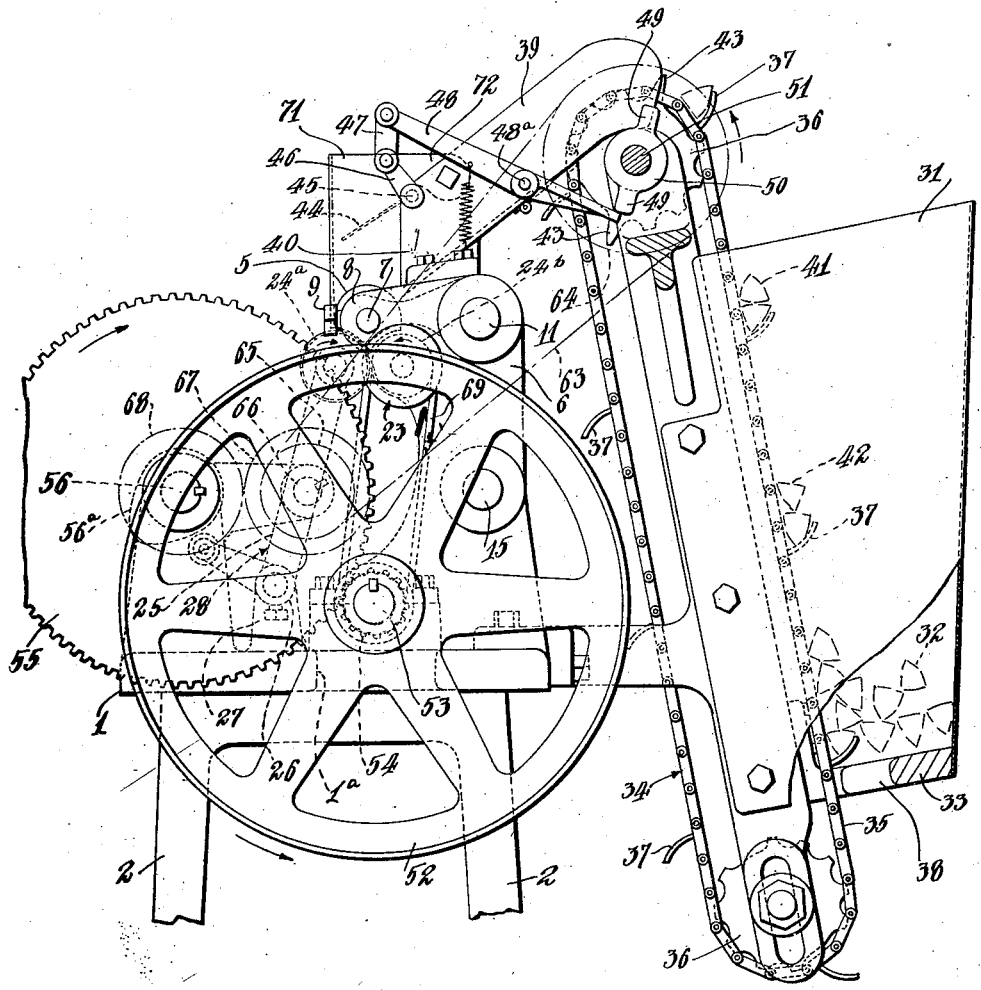
Figure 3 is an end elevation of the mechanism of the machine, that is to say, it shows the mechanism as viewed from the right end of Figure 2, certain parts being broken away.

The relatively fixed roller 24$^b$ of the cradle is rotated by a small belt 69, see Figure 3, from the main shaft 53.

Figure 2:
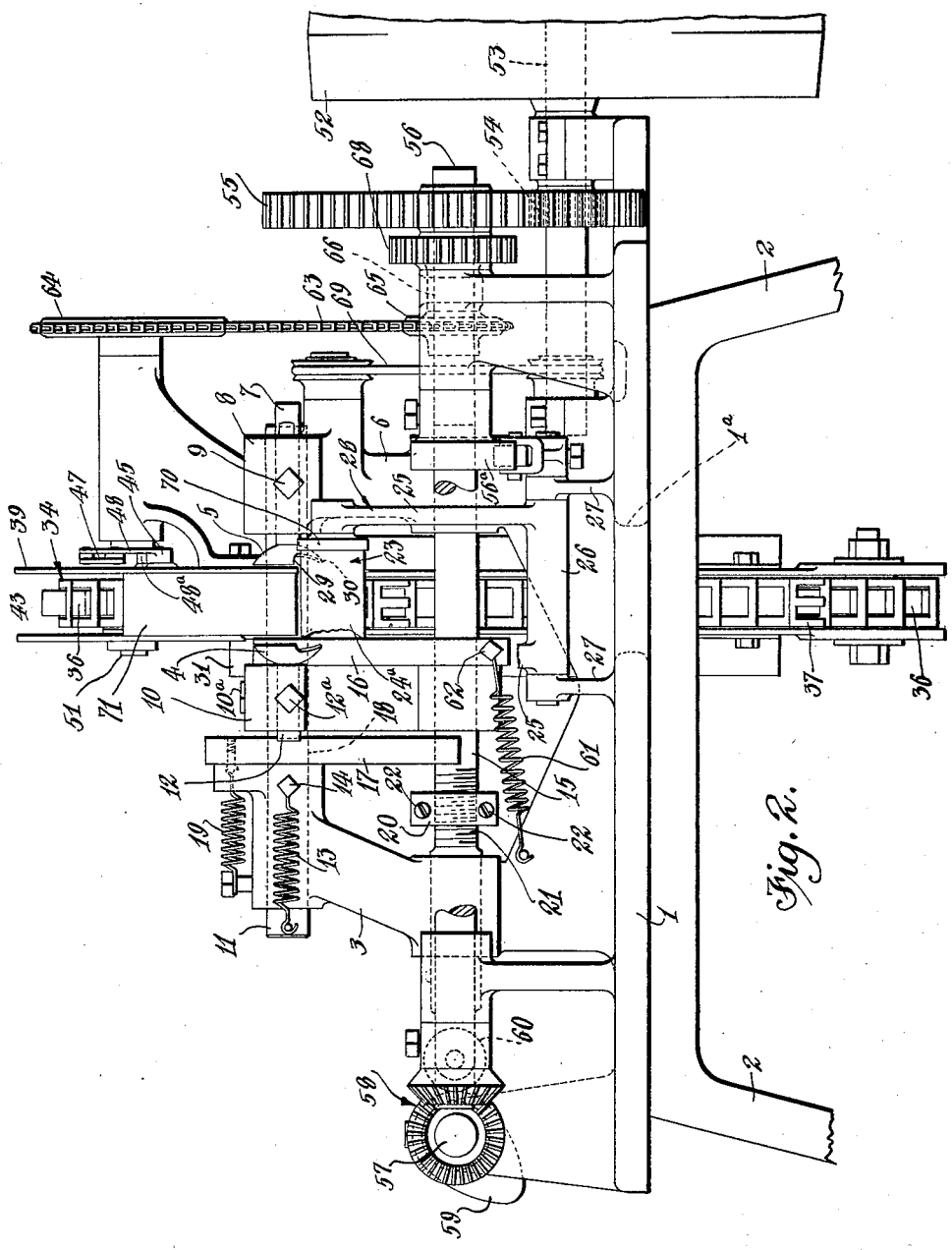
Figure 2 is a side elevation of the machine shown in Figure 1, portions of the same being broken away.

The two rollers 24 have fibre rings 70, see Figure 2, which engage each other frictionally so that the rotation of the roller 24$^b$ which rotates on a fixed axis, is imparted to the roller 24$^a$ which is carried on the rocking frame 28.

In order to prevent any possibility of a nut falling out of the cradle, I provide a guard 71 which is in the form of a bent plate having extensions 72 at its ends which are secured to the side walls of the chute 39.

I shall now describe the general mode of operation of the machine. The nuts are placed in the hopper 31 and the elevator 34 carries them up on the buckets 37 and delivers them into the chute 39. If more than one nut is carried in the bucket, it will be kicked off by one of the kickers 43. When the nut is delivered into the chute, it slides down to the delivery mouth 40 and rests against the gate 44. At the proper moment, the gate 44 is swung outwardly through the action of one of the cams 49 and the lever 48 and this permits the nut to fall down into the cradle formed by the two rollers 24$^a$ and 24$^b$. If the nut to be cracked is an elongated nut such as a pecan or a Brazil nut, these rollers should be rotated continuously. This rotation of the rollers assists in bringing the axis of the nut into substantial alinement with the cracker jaws 4 and 5.

After the nut has been positioned in the cradle, the rotation of the cam 59 operates to shift the operating plunger 15 longitudinally. The first part of the longitudinal movement of this plunger 15 operates to move the detent arm 16 toward the right as viewed in Figure 2 and this permits the springs 13 to pull the plunger 11 of the movable jaw 4, toward the nut so as to set the movable jaw 4 against the end of the nut. In this way, the jaw 4 sets itself automatically against the nut irrespective of the length of the nut before the actual cracking operation commences; in other words, part of the cracking movement involves the setting of the movable jaw against the nut before the cracking force operates to crack the nut. In this way the mechanism adapts itself to the length or diameter of the nut to be cracked. The continued movement of the operating plunger 15 toward the right will carry the collar 20 toward the right and soon after the jaw 4 has set itself against the nut, the collar 20 will engage the arm or clutch plate 17; by reason of the fact that the thrust from the collar 20 is applied to the clutch plate eccentrically the edges of the opening 18 on this clutch plate will clutch the plunger 11 and cause the plunger 15 and jaw 4 to move forwardly in unison to crack the nut. The spring 19 constantly holds the clutch plate 17 up against the end face of the bracket 3, but of course does not prevent the clutch plate from moving with the collar 20. When the collar 20 moves back, due to the continued movement of the cam 59, the detent arm 16 will again engage the right hand face of the carriage 10 and carry the jaw 4 back to its normal position.

It is evident that the cracking mechanism gives all the nuts the same "crack" or compression. This follows by reason of the relative forward (toward the nut) shifting of the movable jaw with respect to the actuating plunger 15 when the springs 13 set the movable jaw 4 up against the nut. In other words, I give the same amount of movement to the movable jaw to crack every nut.

As pointed out above, it is not necessary to my invention that one jaw be fixed and the other movable, but in the cracking operation the jaws should be caused to relatively approach each other by the operation of the setting means to engage the nut, after which the jaws are caused by independent means to approach relatively nearer to each other; this effects the cracking of the nut.

After the nut has been cracked, it is automatically removed from the cradle. This is accomplished through the operation of cam 56ª which actuates the rocker frame 28. This cam operates to rock the rocker frame 28 toward the left as viewed in Figure 3 and this permits the cracked nut to fall down and pass downwardly into a receptacle placed below an opening 1ª formed in the plate of the frame 1, see Figure 2.

What I claim is:

1. In a nut cracking machine, the combination of a frame, means for supporting the nut, a movable jaw, a plunger guided to slide on the frame, means connecting the plunger and the movable jaw operating to set the jaw against the nut during the first part of the movement of the plunger and permitting a relatively forward movement of the jaw with respect to the plunger and operating in the latter part of the movement to move the jaw in unison with the plunger to crack the nut.

2. In a nut cracking machine, the combination of a frame, means for supporting the nut, a movable plunger, a movable jaw movably carried on the plunger, means connecting the plunger and jaw permitting a relative forward movement of the jaw on the plunger to set the same against the nut preparatory to cracking the same, and means for moving the plunger forward to crack the nut.

3. In a nut cracking machine, the combination of a frame, a plunger means for supporting the nut, a movable jaw movable forwardly on the plunger, means for setting the movable jaw forwardly on the plunger and against the nut, and means for imparting the same amount of movement to the jaw to crack the nut irrespective of the size of the nut.

4. In a nut cracking machine, the combination of a cradle consisting of a pair of rollers for supporting the nut, means for cracking the nut while supported on the rollers, and means for separating the rollers to permit the nut to fall out of the cradle.

5. In a nut cracking machine, the combination of a pair of cracking jaws, a cradle having a pair of rollers for supporting the nut between the jaws, means for rotating the rollers to align the nut with the jaws, means for actuating the jaws to crack the nut while supported on the rollers, and means for moving the rollers apart to permit the cracked nut to fall out of the cradle.

6. In a nut cracking machine, the combination of a substantially horizontal cradle for supporting the nut, a jaw for cracking the nut having a supporting plunger, means for guiding the plunger to move longitudinally, means for moving the jaw longitudinally on the plunger to set it against the nut, and means independent of the last named means for forcibly moving the jaw thereafter to crack the nut.

7. In a nut cracking machine, the combination of a substantially horizontal cradle for supporting the nut, a jaw for cracking the nut having a supporting plunger, means for guiding the plunger to move longitudinally, a spring connected with the jaw and exerting its force to urge the jaw toward the nut to set the jaw against the nut preparatory to cracking the same, a detent resisting the force of the spring and holding the jaw away from the nut, and means for operating the detent to permit the spring to set the jaw against the nut, said last named means operating after the jaw is set against the nut by the spring, to move the jaw further and crack the nut.

8. In a nut cracking machine, the combination of a substantially horizontal cradle for supporting the nut, a jaw for cracking the nut having a supporting plunger, means for guiding the plunger to move longitudinally, a spring connected with the jaw and exerting its force to urge the jaw toward the nut to set the jaw against the nut preparatory to cracking the same, a detent resisting the force of the spring and holding the jaw away from the nut, means for operating the detent to permit the spring to set the jaw against the nut, said means operating after the jaw is set against the nut by the spring, to move the jaw further and crack the nut, and automatic means for opening the cradle thereafter to permit the cracked nut to fall out.

9. In a nut cracking machine, the combination of a substantially horizontal cradle for supporting the nut, a relatively fixed jaw, a relatively movable jaw having a supporting plunger, means for guiding the plunger to move longitudinally in the direction of the nut, a spring connected with the plunger for urging the movable jaw in the direction of the nut, a detent operating to prevent the movable jaw from engaging the nut, means for actuating the detent to permit the movable jaw to set itself against the nut preparatory to cracking the same, and operating thereafter to move the movable jaw forcibly against the nut to crack it.

10. In a nut cracking machine, the combination of a substantially horizontal cradle for supporting the nut to be cracked, a chute having its delivery mouth located near the cradle, jaws for cracking the nut supported in the cradle, automatic means for effecting the removal of the cracked nut from the cradle, a gate at the mouth of the chute, and automatic means for operating the gate to permit a single nut to pass from the chute into the cradle.

11. In a nut cracking machine the combination of a frame, means for supporting the nut, a movable jaw with means for supporting and guiding the same to slide substantially horizontally on the frame, setting means for urging the jaw toward the nut, a detent for restraining the setting means to hold the jaw removed from the nut supporting means to permit the placing of the nut in position to be cracked, and means for operating the detent means to permit the setting means to set the jaw against the nut preparatory to cracking it, and operating thereafter to move the jaw forcibly against the nut to crack it.

12. In a nut cracking machine, the combination of a frame, a cradle for supporting the nut, a movable jaw with means for supporting and guiding the same to slide substantially horizontally on the frame, a sliding plunger guided to slide along a line substantially parallel with the direction of guiding the movable jaw, setting means for urging the jaw toward the nut, a detent carried by the plunger for restraining the setting means to hold the jaw removed from the cradle, a clutch associated with the jaw operating to permit the setting means to move the jaw toward the cradle, and a collar on the plunger to operate the clutch and move the jaw against the nut to crack the same after the jaw has been set against the nut.

13. In a nut cracking machine, the combination of a frame, a cradle for supporting the nut, a movable jaw, a guide plunger for supporting and operating the jaw and guided to slide longitudinally on the frame, a spring associated with the stem and urging the jaw in a direction to set the jaw against the nut preparatory to cracking the same, an operating plunger guided to slide on the frame substantially parallel with the first named stem, a detent arm carried by the operating stem to resist the setting spring and prevent the jaw from moving toward the nut, a clutch on the first named plunger permitting the free movement of the stem of the jaw toward the cradle, means for moving the operating stem longitudinally to move the detent away from the jaw to permit the spring to set the jaw against the nut preparatory to cracking the same, and means carried on the operating plungers to engage the clutch thereafter and move the jaw forcibly against the nut to crack the same.

Signed at Los Angeles, this 2d day of March, 1927.

LEON P. ANTHONY.